United States Patent [19]
Brandenburg et al.

[11] Patent Number: 5,040,217
[45] Date of Patent: Aug. 13, 1991

[54] PERCEPTUAL CODING OF AUDIO SIGNALS

[75] Inventors: Karlheinz Brandenburg, Stirling; James D. Johnston, Warren, both of N.J.

[73] Assignee: AT&T Bell Laboratories, Murray Hill, N.J.

[21] Appl. No.: 423,088

[22] Filed: Oct. 18, 1989

[51] Int. Cl.$^5$ ................................................ G10L 5/00
[52] U.S. Cl. ................................................ 381/47
[58] Field of Search ................................. 381/40–49

[56] References Cited

U.S. PATENT DOCUMENTS 4,881,267  11/1989  Taguchi .............................. 381/40
4,945,567  7/1990  Ozawa ................................. 381/49

OTHER PUBLICATIONS

"Digital Audio Tape for Data Storage", *IEEE Spectrum*, Oct. 1989, pp. 34–38, E. Tan and B. Vermeulen.
"Critical Bands", *Foundations of Modern Auditory Theory*, J. V. Tobias, Chapter 5, B. Scharf, Academic Press, New York, 1970.
"Optimizing Digital Speech Coders by Exploiting Masking Properties of the Human Ear", *Journal of Acoustical Society of America*, vol. 66 (6), Dec. 1979, pp. 1647–1652, M. R. Schroeder et al.
"MSC: Stereo Audio Coding with CD-Quality and 256 kBIT/SEC", *IEEE Transactions on Consumer Electronics*, vol. CE-33, No. 4, Nov. 1987, pp. 512–519, E. F. Schroeder and H. J. Platte.
"Transform Coding of Audio Signals Using Perceptual Noise Criteria", *IEEE Journal on Selected Areas in Communications*, vol. 6, No. 2, Feb. 1988, pp. 314–323, J. D. Johnston.
N. S. Jayant and P. Noll, *Digital Coding of Waveforms*—Principles and Applications to Speech and Video, Chapter 12, "Transform Coding".
"Sub-band Transform Coding Using Filter Bank Designs Based on Time Domain Aliasing Cancellation," *IEEE ICASSP*, 1987, J. Princen et al., pp. 2161–2164.
*FX/FORTRAN Programmer's Handbook*, Alliant Computer Systems Corp., Jul. 1988.

*Primary Examiner*—Emanuel S. Kemeny
*Attorney, Agent, or Firm*—W. Ryan

[57] ABSTRACT

A method is disclosed for determining estimates of the perceived noise masking level of audio signals as a function of frequency. By developing a randomness metric related to the euclidian distance between (i) actual frequency components amplitude and phase for each block of sampled values of the signal and (ii) predicted values for these components based on values in prior blocks, it is possible to form a tonality index which provides more detailed information useful in forming the noise masking function. Application of these techniques is illustrated in a coding and decoding context for audio recording or transmission. The noise spectrum is shaped based on a noise threshold and a tonality measure for each critical frequency-band (bark).

16 Claims, 3 Drawing Sheets

PERCEPTUAL CODING OF AUDIO SIGNALS

FIELD OF THE INVENTION

The present invention relates to coding of time varying signals, such as audio signals representing voice or music information.

BACKGROUND OF THE INVENTION

Consumer, industrial, studio and laboratory products for storing, processing and communicating high quality audio signals are in great demand. For example, so-called compact disc (CD) digital recordings for music have largely replaced the long-popular phonograph records. More recently, digital audio tape (DAT) devices promise further enhancements and convenience in high quality audio applications. See, for example, Tan and Vermeulen, "Digital audio tape for data storage," *IEEE Spectrum*, October 1989, pp. 34–38. Recent interest in high-definition television (HDTV) has also spurred consideration of how high quality audio for such systems can be efficiently provided.

While commercially available CD and DAT systems employ elaborate parity and error correction codes, no standard presently exists for efficiently coding source information for high quality audio signals with these devices. Tan and Vermeulen, supra, note that (unspecified) data compression, among other techniques, can be used to increase capacity and transfer rate for DAT devices by a factor of ten over time.

It has long been known that the human auditory response can be masked by audio-frequency noise or by other-than-desired audio frequency sound signals. See, B. Scharf, "Critical Bands," Chap. 5 in J. V. Tobias, *Foundations of Modern Auditory Theory*, Academic Press, New York, 1970. While "critical bands," as noted by Scharf, relate to many analytical and empirical phenonomena and techniques, a central features of critical band analysis relates to the characteristic of certain human auditory responses to be relatively constant over a range of frequencies. Thus, for example, the loudness of a band of noise at a constant sound pressure remains constant as the bandwidth increases up to the critical band; then loudness begins to increase. In the cited Tobias reference, at page 162, there is presented one possible table of 24 critical bands, each having an identified upper and lower cutoff frequency. The totality of the band covers the audio frequency spectrum up to 15.5 kHz. These effects have been used to advantage in designing coders for audio signals. See, for example, M. R. Schroeder et al, "Optimizing Digital Speech Coders By Exploiting Masking Properties of the Human Ear," *Journal of the Acoustical Society of America*, Vol. 66, pp. 1647–1652, December, 1979.

E. F. Schroeder and H. J. Platte, "'MSC': Stereo Audio Coding with CD-Quality and 256 IT/SEC," *IEEE Trans. on Consumer Electronics*, Vol. CE-33, No. 4, November 1987, describes a perceptual encoding procedure with possible application to CDs.

In J. D. Johnston, "Transform Coding of Audio Signals Using Perceptual Noise Criteria," *IEEE Trans. on Selected Areas in Communications*, February 1988, pp. 314–434 and copending application Ser. No. 292,598, filed Dec. 30, 1988, by J. L. Hall II and J. D. Johnston, assigned to the assignee of the present invention, there are disclosed enhanced perceptual coding techniques for audio signals. Perceptual coding, as described in the Johnston, et al paper relates to a technique for lowering required bitrates (or reapportioning available bits) in representing audio signals. In this form of coding, the masking threshold for unwanted signals is identified as a function of frequency of the desired signal. Then the coarseness of quantizing used to represent a signal component of the desired signal is selected such that the quantizing noise introduced by the coding does not rise above the noise threshold, though it may be quite near this threshold. While traditional signal-to-noise ratios for such perceptually coded signals may be relatively low, the quality of these signals upon decoding, as perceived by a human listener, is nevertheless high. In particular, the systems described in this paper and copending application use a human auditory model to derive a short-term spectral masking function that is implemented in a transform coder. Bitrates are reduced by extracting redundancy based on signal frequency analysis and the masking function. The techniques use a so-called "tonality" measure indicative of the shape of the spectrum over the critical bands of the signal to be coded to better control the effects of quantizing noise. As noted in the Johnston paper, supra, and the cited patent application Ser. No. 292,598, the masking effect of noise is dependent on the "tonelike or noiselike" nature of the signal. In particular, an offset for the masking threshold for each critical band is developed which depends on whether a "coefficient of tonality" for the signal in each critical band indicates that the signal is relatively more tonelike or noiselike. This coefficient of tonality is, in turn, conveniently derived from a measure of flatness of the spectrum of the signal over that critical band.

SUMMARY OF THE INVENTION

The present invention improves on the tonality based perceptual coding techniques described in the cited copending application Ser. No. 292,598. Because the frequency analysis typically involves determining spectral information at discrete frequencies ("frequency lines") within the audio spectrum, and because a number of these discrete frequencies will, in general, fall within each critical band, the processing described in the prior application Ser. No. 292,598 and the cited Johnston paper, illustratively grouped spectral values for frequencies within each critical band. That is, the spectral processing used to determine the tonality and masking threshold was typically accomplished on a critical-band-by-critical-band basis. The improvements made in accordance with aspects of the present invention permit grouping of values at discrete frequencies, but also include the use of a frequency-line-by-frequency-line analysis, rather than analysis on a spectrum-wide basis, in calculating the tonality metric values. This line-by-line calculation is advantageously based on a history of consecutive frames of the input power spectrum, rather than on the current frame alone. The present invention then advantageously determines improved estimates of perceptual thresholds on a line-by-line basis, rather than on a critical-band-by-critical-band basis. In appropriate cases, the critical band masking threshold can be used.

More particularly, the tonality estimate of the present invention advantageously uses a statistic of a plurality, typically two, of the previous time frames to predict the value of a given power spectrum frequency line in the current time frame. This process features the use of a Eculidian distance between the predicted line and the actual line in a present frame to estimate the tonality (or noisiness) of each spectral line. It proves convenient in these calculations to perform a normalization of the estimates using the predicted and actual values. These tonality estimates can then be combined, e.g., on a critical-band basis, to obtain an estimate of the actual tonality. This is done for each frequency to determine the noise-masking thresholds to be used in quantizing the frequency information to be finally coded for recording, transmission or other use.

A spreading operation known in the art, e.g., that described generally in the Schroeder, et al paper, supra, is employed in an alternative implementation of certain aspects of the improved masking threshold determination process of the present invention. Spreading generally relates to the masking effect on a signal at a given frequency by signals separated in frequency from the given signal frequency. In the above cited prior application Ser. No. 292,598, and the Johnston paper, matrix processing is disclosed which involves signal spreading effects from signals many bark frequencies away. A bark is the term used to indicate a frequency difference of one critical band.

Other features and improvements of the present invention will appear from the following detailed description of an illustrative embodiment.

DETAILED DESCRIPTION

To simplify the present disclosure, copending application, Ser. No. 292,598, filed Dec. 30, 1988, by J. L. Hall II and J. D. Johnston, assigned to the assignee of the present invention; J. D. Johnston, "Transform Coding of Audio Signals Using Perceptual Noise Criteria," *IEEE Journal on Selected Areas in Communications*, Vol. 6, No. 2, February, 1988; and International Patent Application (PCT) WO 88/01811, filed Mar. 10, 1988 by K. Brandenburg are hereby incorporated by reference as if set forth in their entirety herein.

Also incorporated by reference as set forth in its entirety herein is a proposal submitted by the assignee of the present application, inter alia, to the International Standards Organization (ISO) on Oct. 18, 1989 for consideration by the members of that body as the basis for a standard relating to digital coding. This document, entitled "ASPEC" will hereinafter be referred to as "the ISO Document".

Application Ser. No. 292,598 describes a perceptual noise threshold estimation technique in the context of the well-known transform coder. See also, for example, N. S. Jayant and P. Noll, *Digital Coding of Waveforms—Principles and Applications to Speech and Video*, especially, Chapter 12, "Transform Coding."

The application WO 88/01811 describes the so-called OCF coder that may be used as one alternative to the transform coder described in the Jayant, et al reference or the application Ser. No. 292,598.

Figure 1:
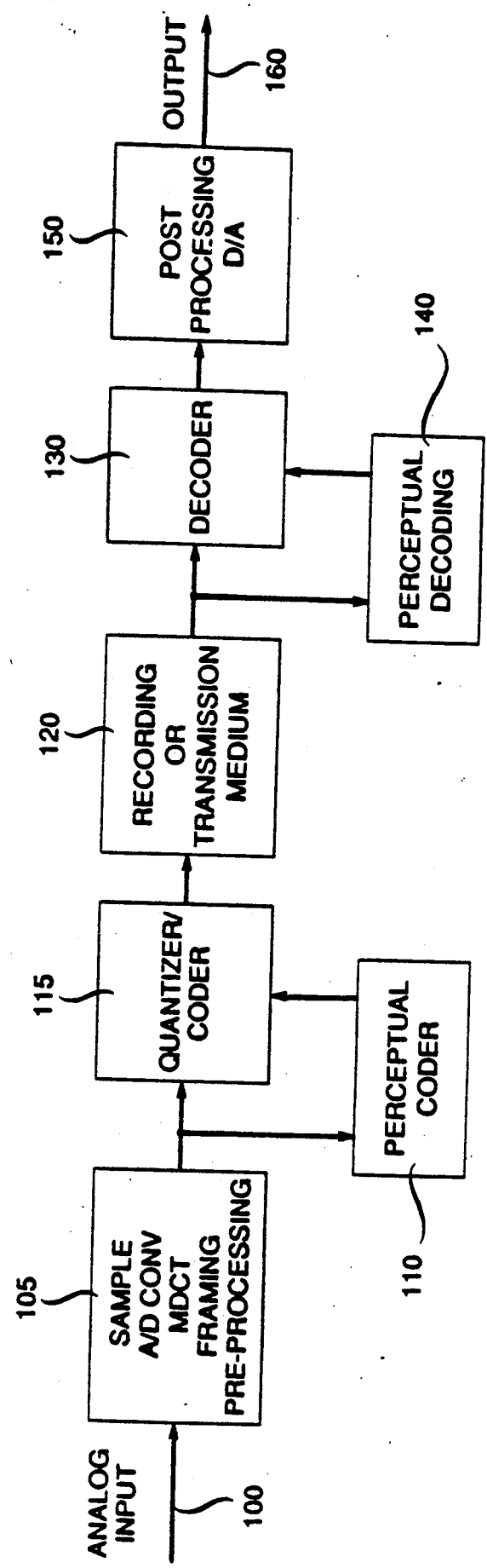
FIG. 1 is a block diagram of an overall system based on the present invention.

FIG. 1 of the present application discloses the overall organization of a system incorporating the present invention.

In that figure, an analog signal on input 100 is applied to preprocessor 105 where it is sampled (typicall at 32 kHz) and each sample is converted to a digital sequence (typically 16 bits) in standard fashion. Preprocessor 105 then groups these digital values in frames (or blocks or sets) of, e.g., 512 digital values, corresponding to, e.g., 16 msec of audio input. Other typical values for these and other system or process parameters are discussed in the ISO Document.

It also proves advantageous to overlap contiguous frames, typically to the extent of 50 percent. That is, though each frame contains 512 ordered digital values, 256 of these values are repeated from the preceding 512-value frame. Thus each input digital value appears in two successive frames, first as part of the second half of the frame and then as part of the first half of the frame.

These frames are then transformed in standard fashion using, e.g., the modified discrete cosine transform (MDCT) described in Princen, J., et al, "Sub-band Transform Coding Using Filter Bank Designs Based on Time Domain Aliasing Cancellation," *IEEE ICASSP*, 1987, pp. 2161-2164. The well-known short-term Fast Fourier Transform (FFT) in one of its several standard forms can be adapted for such use as will be clear to those skilled in the art. The set of 257 complex coefficients (zero-frequency, Nyquist frequency, and all intermediate frequencies) resulting from the MDCT represents the short-term frequency spectrum of the input signal.

The complex coefficients are conveniently represented in polar coordinate or amplitude and phase components, indicated as "r" and "phi," respectively, in the sequel.

While not shown explicitly in FIG. 1, the present invention advantageously utilizes known "pre-echo" and dynamic windowing techniques described, for example, in the above-referenced ISO Document. Other pre-processing techniques that can be included in the functionality represented by preprocessor block 105 in FIG. 1 include those described in the ISO Document.

Perceptual coder block 110 shown in FIG. 1 includes the perceptual masking estimation improvements of the present invention and will be described in detail below. Quantizer/Coder block 115 in FIG. 1 represents the above-mentioned transform or OCF coder and related coder functionality described in the incorporated application Ser. No. 292,598 and the ISO Document.

Block 120 in FIG. 1 represents the recording or transmission medium to which the coded output of quantizer/coder 115 are applied. Suitable formatting and modulation of the output signals from quantizer/coder 115 is included in the medium block 120. Such techniques are well known to the art and will be dictated by the particular medium, transmission or recording rates and other system parameters.

Further, if the medium 120 includes noise or other corrupting influences, it may be necessary to include additional error-control devices or processes, as is well known in the art. Thus, for example, if the medium is an optical recording medium similar to the standard CD devices, then redundancy coding of the type common in that medium can be used with the present invention.

If the medium is one used for transmission, e.g., a broadcast, telephone, or satellite medium, then other appropriate error control mechanisms will advantageously be applied. Any modulation, redundancy or other coding to accommodate (or combat the effects of)

the medium will, of course, be reversed upon the delivery from the channel or other medium to the decoder. The originally coded information provided by quantizer/coder 115 will therefore be applied at a reproduction device.

More particularly, these coded signals will be applied to decoder 130 shown in FIG. 1, and to perceptual decoder 140. As in the case of the system described in application Ser. No. 292,598, some of the information derived by perceptual coder 110 and delivered via quantizer/coder 115 and medium 120 to the perceptual decoder 140 is in the nature of "side information." Such side information is described more completely below and in the ISO Document. Other information provided by quantizer/coder 115 via medium 120 relating to the spectral coefficients of the input information is illustratively provided directly to decoder 130.

After processing the side information, perceptual decoder 140 provides decoder 130 with the additional information to allow it to recreate, with little or no perceptual distortion, the original spectral signals developed in pre-processor 105. These recreated signals are then applied to post-processor 150, where the inverse MDCT or equivalent operations and D/A functions are accomplished (generally as described in application Ser. No. 292,598) to recreate the original analog signal on output 160. The output on 160 is in such form as to be perceived by a listener as substantially identical to that supplied on input 100.

PERCEPTUAL THRESHOLD VALUES

With the overall system organization described above as background, and with the details of the incorporated application Ser. No. 292,598 as a baseline or reference, the improved process of calculating the threshold value estimates in accordance with the present invention will be described. The ISO Document should also be referred to for more detailed descriptions of elements of the present invention and for alternative implementations.

Figure 2:
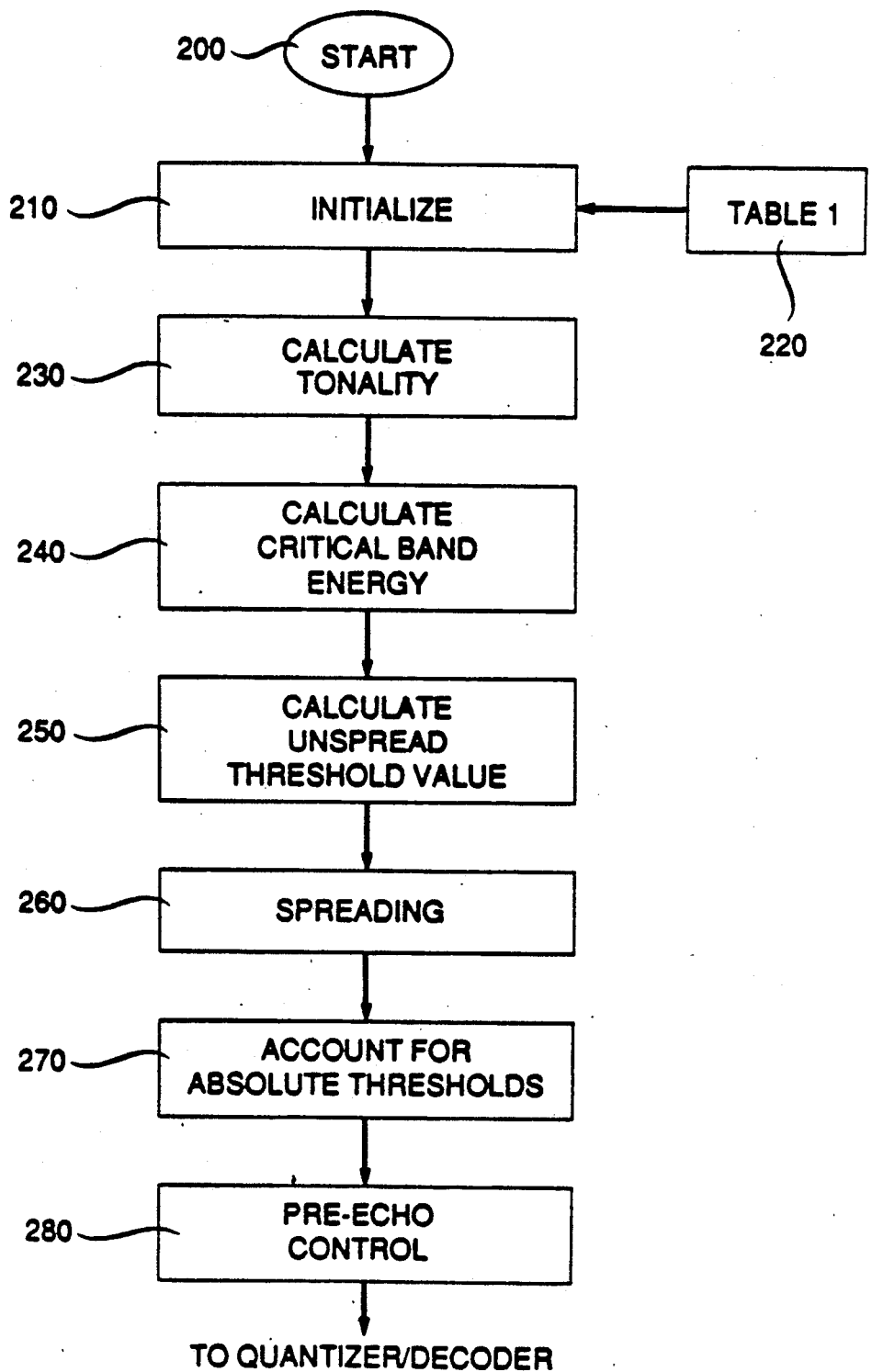
FIG. 2 is a flow chart illustrating the masking threshold processing employed in an illustrative embodiment of the coder in accordance with the present invention.

FIG. 2 is a flow chart representation of the processing accomplished in perceptual coder 110. Listing 1, attached, forms part of this application. This listing is an illustrative annotated FORTRAN program listing reflecting processing in accordance with aspects of the present invention relating to developing a noise masking threshold. A useful reference for understanding the FORTRAN processing as described herein is *FX/FORTRAN Programmer's Handbook*, Alliant Computer Systems Corp., July 1988. Likewise, general purpose computers like those from Alliant Computer Systems Corp. can be used to execute the program of Listing 1. Table 1 is a list of constants used in connection with the illustrative program of Listing 1.

While a particular programming language, well known to the art, is used in Listing 1, those skilled in the art will recognize that other languages will be appropriate to particular applications of the present invention. Similarly, constants, sampling rates and other particular values will be understood to be for illustrative purposes only, and in no sense should be interpreted as a limitation of the scope of the present invention.

FIG. 2 and Listing 1 will now be discussed in detail to give a fuller understanding of the illustrative embodiment of the present invention.

Function 200 in FIG. 2 indicates the start of the processing performed in determining the improved estimates of the masking thresholds in accordance with the present invention. Block 210 represents the initializing functions, using the absolute threshold values from Table 1, represented by block 220 in FIG. 2.

These initializing or startup operations are depicted explicitly in Listing 1 by the subroutine strt( ). In this illustrative subroutine, threshold generation tables ithr and bval are set up first.

It should be noted that i is used, e.g., as the index for the critical bands, of the type described in the application Ser. No. 292,598, and has values from 0 to 25. The index i may be used with different ranges for other processing in other occurrences appearing in Listing 1.

In strt( ), abslow is a constant assigned the indicated value to set the absolute threshold of hearing. rzotz is the desired sampling rate. rnorm is a normalization variable used in connection with the spreading function. openas is simply an operator used for opening an ascii file. db is a dummy variable used to calculate table entries.

The actual threshold calculation begins with the subroutine thrgen. Its variables r and phi are, of course, the spectral coefficients provided by preprocessor 105 in FIG. 1. They are vectors having 257 values (zero frequency, the Nyquist frequency and all intermediate components).

Block 210 represents the initialization, using the absolute threshold information in Table 1 (shown in block 220 in FIG. 2).

The next step in calculation of the perceptual threshold is the calculation of the tonality t(j) of the signal energy within each critical band j. This operation is indicated by block 230 in FIG. 2. The tonality metric is determined in accordance with the program of Listing 1 by forming $$dr(\omega) = r_{t-1}(\omega) - r_{t-2}(\omega)$$

and $$d\phi(\omega) = \phi_{t-1}(\omega) - \phi_{t-2}(\omega).$$

dr and d$\phi$ are the differences between the radius ($r(\omega)$) and phase ($\phi(\omega)$) of the previous calculation block and the one two previous. The calculation is done on a frequency line by frequency line ($\omega$) basis. Note that if the blocks are shortened by the dynamic windowing technique referred to in the ISO Document, the frequency lines are duplicated accordingly, so that the number of frequency lines remains the same. Additionally, the difference is multiplied accordingly in such a dynamic windowing context, so that it represents the (estimated) difference over one differently sized block.

From the dr and d$\phi$ values and the previous r and $\phi$, the "expected" radius and phase for the current block are calculated:

$$\hat{r}(\omega) = r_{t-1}(\omega) + dr(\omega)$$

and $$\hat{\phi}(\omega) = \phi_{t-1}(\omega) + d\phi(\omega),$$

where the $\omega$ and difference signals are again adjusted appropriately for the dynamic windowing, if present.

From these values and the actual values for the current spectrum, a randomness metric ($c(\omega)$) is calculated:

$$c(\omega) = \frac{\text{euclidian distance}((r(\omega),\phi(\omega)),(\hat{r}(\omega),\hat{\phi}(\omega)))}{r(\omega) + abs(\hat{r}(\omega))}$$

c values are used later to calculate the appropriate threshold in each critical band, through the calculation of t(j).

Next, the critical band energy calculation is made, as indicated by block 240 in FIG. 2.

The energy in each critical band is $$P(j) = \sum_{\omega \text{ in critical band } j} r_i^2(\omega)$$

and the summed randomness metric, C(j) is $$C(j) = \frac{\sum_{\omega \text{ in critical band } j} r_i^2(\omega) * c(\omega)}{P(j)}$$

The C(j) are then converted to the tonality index, t(j) in two steps $$tmp(j) = \max(0.05, \min(0.5, C(j))),$$

then $$t(j) = 0.43 * \ln tmp(j) - 0.299$$

It is now possible to derive the unspread threshold values.

From the power and the tonality values, the unspread threshold uthr(j) is calculated. First, the proper value for the masking SNR ($snr_{db}(j)$), corresponding to frequency and tonality, is calculated in decibels:

$$snr_{db}(j) = \max(\max(24.5, 15.5 + j) * t(j) + 5.5 * (1. - t(j)), fmin(j))$$

where fmin is tabulated in the ISO Document and in Table 2 as an energy ratio, rather than in db. Table 2 also indicates critical band boundaries, expressed in terms of frequency lines for the indicated sampling rate. Then the ratio of masked noise energy to signal energy is calculated:

$$snr(j) = 10^{\frac{-snrdb(j)}{10}}$$

and the unspread threshold value is calculated:
$$uthr(j) = P(j) * snr(j).$$

The spread threshold (sthr) is calculated from the unspread threshold, the snr(j), and the critical band energies, (P(j)), according to $$sthr(j) = \max(uthr(j), snr(j) * P(i) * mask(i-j)[i>j])$$

where mask(i−j) is tabulated at the end of the ISO Document, and represents an example modified spreading function. Alternatively, the spreading may be accomplished using the function sprdgf(j, i) given in Listing 1.

After spreading, the spread threshold is compared to the absolute threshold, and the maximum substituted in the limited threshold, lthr(j). As noted in the Johnston paper cited above, this adjustment is made because it is not practical to specify a noise threshold that is lower than the level at which a person could hear noise. Any such threshold below the absolute level at which it could be heard could result in waste of resources. Thus the absolute threshold is taken into account by lthr(j)=max(thr(j), absthr(j)), where absthr(j) is tabulated at the end of the ISO document. Note that the absolute threshold is adjusted for actual block length.

Finally, the threshold is examined, after adjustment for block length factors, for narrow-band pre-echo problems. The final threshold, thr(j) is then calculated:

$$thr(j) = \min(lthr(j), 2 * othr(j))$$

and othr is then updated:

$$othr(j) = lthr(j).$$

The threshold lthr(j) is transferred to a variable named lxmin(j) for use in the outer iteration loop described in the ISO Document.

A final step in the threshold calculation procedure calculates an entropy measure that is used to estimate the number of bits needed for the current signal block. This estimate is derived for use by the quantizer/coder 115 using.

$$pe = \sum_{\text{all } \omega} 2\ln_2\left(2 * abs\left(\frac{nint(r(\omega))}{12 * thr(j \text{ appropriate for omega})}\right) + 1\right)$$

This completes the perceptual threshold processes.

An output of the processing described above and in Listing 1 is a set of threshold values that the quantizer/coder 115 FIG. 1 employs to efficiently encode the input signal information for transmission or storage as described above.

While the preceding description of an illustrative embodiment of the present invention has referred to a particular programming language and type of processors, it will be recognized by those skilled in the art that other implementations will be desirable in particular cases. For example, in consumer products size requirements may dictate that high performance general purpose or special purpose microprocessors like those from AT&T, Intel Corp. or Motorola be used. For example, various of the AT&T DSP-32 digital signal processing chips have proved useful for performing processing of the type described above. In other particular cases, special purpose designs based on well-known chip design techniques will be preferably employed to perform the above described processing.

The tonality metric determined in the illustrative embodiment above using differences between the values of $r(\omega)$ and $\phi(\omega)$ from the present block and the corresponding values from the two previous blocks. In appropriate cases, it may prove advantageous to form such a difference using only one prior value in evaluating these variables, or using a plurality greater than two of such prior values, as the basis for forming the expected current values.

Likewise, though values for certain of the variables described above are calculated for each spectral frequency line, it may prove to be an economical use of processing resources to calculate such values for less than all of such lines.

Aspects of the processing accomplished by quantizer/coder 115 and decoder 130 in FIG. 1 will now be described, based on materials included in the ISO Document.

The inputs to quantizer/coder 115 in FIG. 1 include spectral information derived by MDCT and other processing in accordance with functions represented by bloth 105 in FIG. 1, and outputs of perceptual coder 110, including the noise threshold information and perceptual energy information. Quantizer/coder 115 then processes this information and in doing so provides a bistream to the channel or recording medium 120 in FIG. 1, which bistream includes information divide into three main parts:

a first part containing the standardized side information, typically in a fixed length record;

a second part containing the scaling factors for the 23 critical bands and additional side information used for so-called adaptive window switching, when used; the length of this part can vary depending on information in the first part; and a third part containing the entropy coded spectral values, typically in the form of the well-known two-dimensional Huffman code.

Typical apportionment for information provided by quantizer/coder 115 is summarized in Table 3.

| PART I | | |
|---|---|---|
| sync work (0110111) | signals the start of the block | 7 bit |
| position of parts 2 & 3 (bitsav) | difference between the last bit of part 2 & 3 and the first bit of part 1 | 12 bit |
| word length selector for part 2 (cbtable) | selects by a table a word length for the scaling factors for the 12 lower critical bands between 0..4 and for the higher critical bands between 0..3. Four combinations with a small expectation are unused | 4 bit |
| number of big spectral values (bigvalues) | number of pairs of spectral values that are coded with a two dimensional Huffman code, able to code values larger than 1×1 the so called small spectral values | 8 bit |
| quantizer and global gain information (Gain) | level differences between original and quantized values in steps of $2^{\frac{1}{4}}$ | 7 bit |
| Huffman codetable (iqfeld) | values 0..3 select a 4×4, 8×8, 16×16 or 32×32 codetable values>3 select a 32×32 ESC-table when 31 is an ESC-character followed by (Huffman codetable-3) bits of linear transmitted part of the spectral value, that has to be added to the 31 | 4 bit |
| pre-emphasis (preflag) | flag, that the higher part of the spectrum is quantized with a smaller quantizer step size | 1 bit |
| critical band scaling stepsize (ps-scale) | flag, whether the critical band scaling factor has a stepsize of 2 or $2^{\frac{1}{2}}$ | 1 bit |
| block split (split-flag) | flag, whether the block is split into subblocks (dynamic windowing) | 1 bit |
| 0/1 codetable (count 1 table) | selection of one of two possible codebooks for the coding of small values (−1,0,1) | 1 bit |
| DC-part of the signal (dc-value) | | 9 bit |
| | | 55 bit |

PART II

The following bits are dependent on the side information of part 1 (e.g. subblock information is only needed if coding in subblocks is actually selected)

| | | |
|---|---|---|
| global gain for subblock 2 | | 3 bit |
| DC-value of subblock 2 | | 9 bit |
| global gain for subblock 3 | | 3 bit |
| DC-value of subblock 3 | | 9 bit |
| global gain for subblock 4 | | 3 bit |
| DC-value of subblock 4 | | 9 bit |
| scaling factors for the lower 12 critical bands | 12 *(0..4) | 48 bit |
| scaling factors for the higher 11 critical bands | 11 *(0..3) | 33 bit |
| | | 117 bit |

PART III

Huffman coded spectral values about 0 ... 4000 bit

A part of the Huffman code is ordered in a two-dimenional array with the number of columns depending on the longest codeword of the Huffman codetable (5, 16, 18, 22 or 19 bits for ESC-tables). The number of rows is the size of part 3 divided by the number of columns. The codewords of the higher frequencies that can not be ordered into this rectangular array are fit into the remaining gaps.

Signs of values not equal to 0 follow the codeword directly.

When using the ESC-table, up to 4 msb+sign of the linear transmitted part follow the codeword directly the 1 sb+sign are filled in the gaps.

******+xxxxxxxxxxx*****+mmmmxxx*-−xxxxxxxxxxxxxxxxx** . . .

1. start of row 2. start of row 3. start of row 4. . . .
* bits of Huffman codeword ordered in the array
+ sign of the first spectral values
− sign of the second spectral values
m msb's of the linear part of an ESC-value
x gaps, filled by the rest of the Huffman code and the 1 sb's The advantage of the array, which is sent in row by row order as the bitstream, is the restriction of error propagation to higher frequencies.

Figure 3:
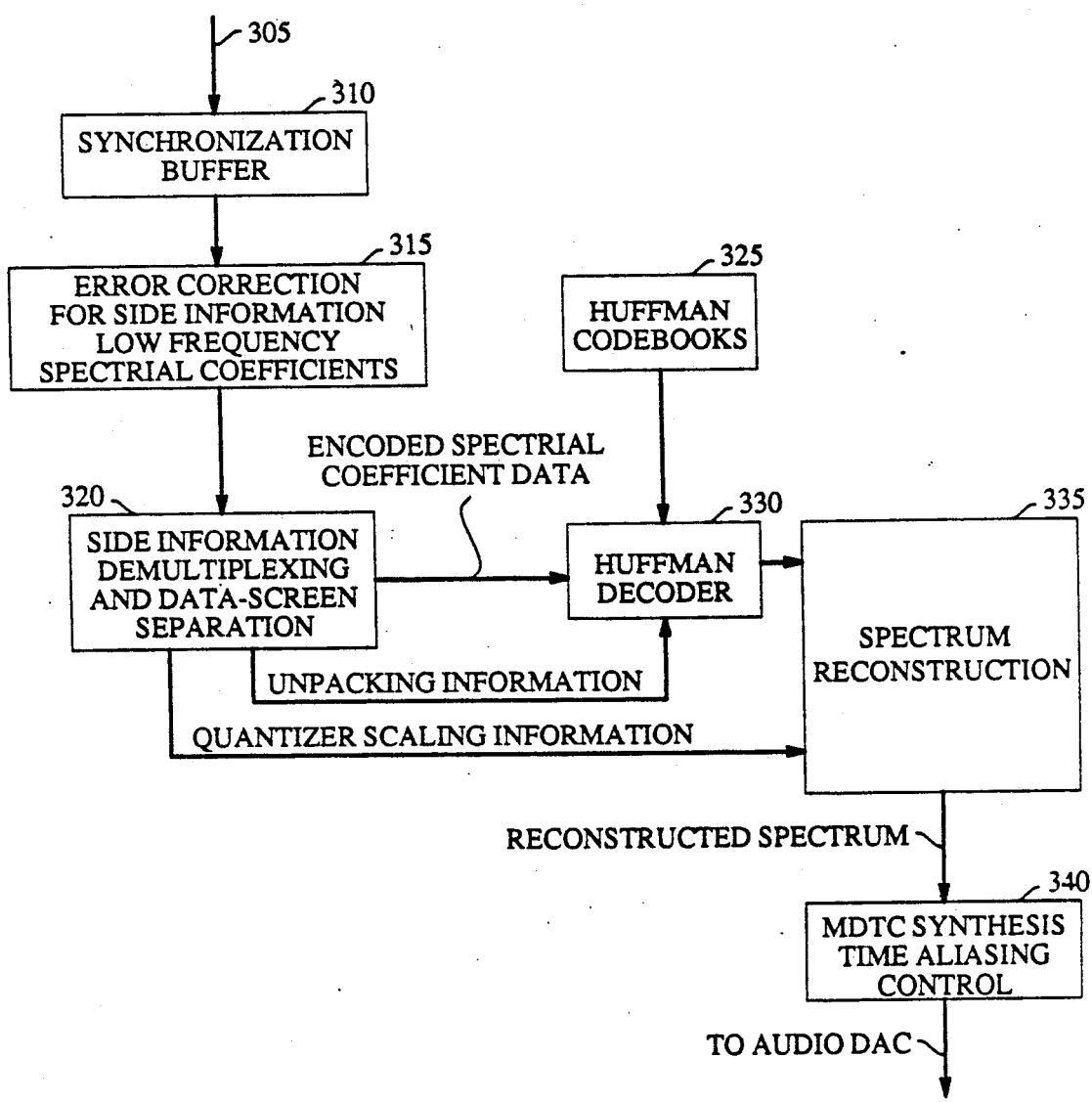
FIG. 3 shows a detailed block diagram of a decoder that may be used in the system of FIG. 1.

FIG. 3 shows a detailed block diagram of a decoder in accordance with aspects of the present invention. FIG. 3 shows a synchronization buffer 310 which acts to appropriately buffer input bitstreams arriving on input lead 305. Error correction is then effected in the part of the system represented by block 315. This block also provides for extraction of low frequency spectral coefficients.

Side information extracted in block 320 is demultiplexed from the other arriving information and is sent to either the Huffman coder 330 or the speech reconstruction functional elements 335. The actual coded spectral coefficient information is sent to the Huffman decoder itself. The decoder 330 is provided with a stored Huffman codebook equivalent to that maintained at the coder of FIG. 1. After the spectrum information is reconstructed, the MDCT synthesis (or other frequency synthesis operation) is applied to reverse the original frequency analysis performed preparatory to coding. Standard aliasing techniques are then applied to provide samples to be converted by digital-to-analog conversion and reproduction to acoustic or other analog signals.

LISTING 1

```
c    First startup routine
     subroutine strt()
c    sets up threshold generation tables, ithr and bval
     real freq(0:25)/0.,100.,200.,300.,400.,510.,630.,770.,
    1 920.,1080.,1270.,1480.,1720.,2000.,2320.,2700.,
    1 3150.,3700.,4400.,5300.,6400.,7700.,9500.,12000.,15500.,
    1 25000./
     common/thresh/ithr(26),bval(257,rnorm(257)
     common/absthr/abslow(257)
     common/sigs/ifirst
c    ithr(i) is bottom of crital band i. bval is bark index
c    of each line
     write(*,*) 'what spl will + - 32000 be →'
     read(*,*) abslev
     abslev=abslev-96.
     abslow=5224245.*5224245./exp(9.6*alog(10.))
     ifirst=0
     write(*,*) 'what is the sampling rate'
     read(*,*) rzotz
     fnyq=rzotz/2.
c    nyquest frequency of interest.
     ithr(1)=2.
     i=2
10   ithr(i)=freq(i-1)/fnyq*256.+2.
     i=i+1
     if (freq(i-1) .lt. fnyq) goto 10
c    sets ithr to bottom of cb
     ithr(i:26)=257
c    now, set up the critical band indexing array
     bval(1)=0
c    first, figure out frequency, then . . .
     do i=2,257,1
     fre=(i-1)/256.*fnyq
c    write(*,*) i,fre
c    fre is now the frequency of the line. convert
c    it to critical band number..
     do j=0,25,1
     if (fre .gt. freq(j)) k=j
     end do
c    so now, k = last CB lower than fre
     rpart=fre-freq(k)
     range=freq(k+1)-freq(k)
     bval(i)=k+rpart/range
     end do
     rnorm=1
     do i=2,257,1
     tmp=0
     do j=2,257,1
     tmp=tmp+sprdngf(bval(j),bval(i))
     end do
     rnorm(i)=tmp
     end do
     rnorm=1./rnorm
c    do i=1,257,1
c    write(*,*) i, bval(i), 10.*alog10(rnorm(i))
c    end do
     call openas(0,'/usr/jj/nsrc/thrtry/freqlist',0)
     do i=2,257,1
```

-continued

LISTING 1

```
     read(0,*) ii,db
     if (ii .ne. i) then
     write(*,*) 'freqlist is bad.'
     stop
     end if
     db=exp((db-abslev)/10.*alog(10.))
c    write(*,*) i,db
     abslow(i)=abslow(i)*db
     end do
     abslow(1)=1.
     write(*,*) 'lowest level is ', sqrt(abslow(45))
     return
     end
c    Threshold calculation program
     subroutine thrgen(rt,phi,thr)
     real r(257),phi(257)
     real rt(257)
     real thr(257)
     common/blnk/ or(257),ophi(257),dr(257),dphi(257)
     common/blk1/othr(257)
     real alpha(257),tr(257),tphi(257)
     real beta(257),bcalc(257)
     common/absthr/abslow(257)
     common/thresh/ithr(26),bval(257),rnorm(257)
     common/sigs/ifirst
     r=max(rt,.0005)
     bcalc=1.
     if (ifirst .eq. 0) then
     or=0.
     othr=1e20
     ophi=0
     dr=0
     dphi=0
     ifirst=1
     end if
c    this subroutine figures out the new threshold values
c    using line-by-line measurement.
     tr=or+dr
     tphi=ophi+dphi
     dr=r-or
     dphi=phi-ophi
     or=r
     ophi=phi
     alpha=sqrt((r*cos(phi)-tr*cos(tphi))
    1 *(r*cos(phi)-tr*cos(tphi))
    2 +(r*sin(phi)-tr*sin(tphi))
    3 *(r*sin(phi)-tr*sin(tphi)))
    4 / ( r + abs(tr) +1.)
     beta=alpha
c    now, beta is the unweighted tonality factor
     alpha=r*r
c    now, the energy is in each
c    line. Must spread. (ecch)
c    write(*,*) 'before spreading'
     thr=0.
     bcalc=0.
cvd$l cncall
     do i=2,257,1
cvd$l cncall
     do j=2,257,1
     glorch=sprdngf(bval(j),bval(i))
     thr(i)=alpha(j)*glorch+thr(i)
     bcalc(i)=alpha(j)*glorch*beta(j)+bcalc(i)
c    thr is the spread energy, bcalc is the weighted chaos
     end do
c    if (thr(i) .eq. 0 ) then
c    write(*,*) 'zero threshold, you blew it'
c    stop
c    end if
     bcalc(i)=bcalc(i)/thr(i)
     if (bcalc(i) .gt. .5) bcalc(i)=1.-bcalc(i)
c    that normalizes bcalc to 0-.5
     end do
c    write(*,*) 'after spreading'
     bcalc=max(bcalc,.05)
     bcalc=min(bcalc,.5)
c    bcalc is now the chaos metric, convert to the
c    tonality metric
     bcalc=-.43*alog(bcalc)-.299
c    now calculate DB
     bcalc=max(24.5,(15.5+bval))*bcalc+5.5*(1.-bcalc)
```

-continued

LISTING 1

```
      bcalc=exp((-bcalc/10.) * alog (10.))
c     now, bcalc is actual tonality factor, for power
c     space.
      thr=thr*rnorm*bcalc
c     threshold is tonality factor times energy (with
      normalization)
      thr=max(thr,abslow)
      alpha=thr
      thr=min(thr,othr*2.)
      othr=alpha
c     write(*,*) 'leaving thrgen'
      return
      end
c     And, the spreading function
      function sprdngf(j,i)
      real i,j
      real sprdngf
c     this calculates the value of the spreading function for
c     the i'th bark, with the center being the j'th
c     bark
      temp1=i-j
      temp2=15.811389 +7.5*(temp1+.474)
      temp2=temp2- 17.5*sqrt(1.+ (temp1+.474)*
      (temp1+.474))
      if ( temp2 .le. -100.) then
      temp3=0.
      else
      temp2=temp2/10.*alog(10.)
      temp3=exp(temp2)
      end if
      sprdngf=temp3
      return
      end
```

TABLE I

Absolute Threshold File -
("freqlist" for start-up routine)

| | | | | | | | |
|---|---|---|---|---|---|---|---|
| 1 | | 56 | 3. | 111 | 16. | 166 | 16. | 221 | 50. |
| 2 | 27. | 57 | 4. | 112 | 17. | 167 | 16. | 222 | 50. |
| 3 | 18. | 58 | 4. | 113 | 17. | 168 | 16. | 223 | 50. |
| 4 | 16. | 59 | 5. | 114 | 17. | 169 | 16. | 224 | 50. |
| 5 | 10. | 60 | 5. | 115 | 17. | 170 | 16. | 225 | 50. |
| 6 | 9. | 61 | 5. | 116 | 18. | 171 | 17. | 226 | 50. |
| 7 | 8. | 62 | 6. | 117 | 18. | 172 | 17. | 227 | 50. |
| 8 | 8. | 63 | 6. | 118 | 18. | 173 | 17. | 228 | 50. |
| 9 | 8. | 64 | 6. | 119 | 18. | 174 | 17. | 229 | 50. |
| 10 | 8. | 65 | 6. | 120 | 18. | 175 | 17. | 230 | 50. |
| 11 | 8. | 66 | 7. | 121 | 18. | 176 | 17. | 231 | 50. |
| 12 | 7. | 67 | 7. | 122 | 18. | 177 | 18. | 232 | 50. |
| 13 | 7. | 68 | 7. | 123 | 18. | 178 | 18. | 233 | 50. |
| 14 | 7. | 69 | 8. | 124 | 17. | 179 | 18. | 234 | 60. |
| 15 | 7. | 70 | 9. | 125 | 17. | 180 | 18. | 235 | 60. |
| 16 | 7. | 71 | 10. | 126 | 16. | 181 | 18. | 236 | 60. |
| 17 | 7. | 72 | 10. | 127 | 16. | 182 | 19. | 237 | 60. |
| 18 | 7. | 73 | 10. | 128 | 16. | 183 | 19. | 238 | 60. |
| 19 | 7. | 74 | 10. | 129 | 16. | 184 | 19. | 239 | 60. |
| 20 | 7. | 75 | 10. | 130 | 15. | 185 | 19. | 240 | 60. |
| 21 | 7. | 76 | 10. | 131 | 15. | 186 | 19. | 241 | 60. |
| 22 | 7. | 77 | 10. | 132 | 15. | 187 | 20. | 242 | 60. |
| 23 | 7. | 78 | 10. | 133 | 15. | 188 | 21. | 243 | 60. |
| 24 | 7. | 79 | 10. | 134 | 14. | 189 | 22. | 244 | 60. |
| 25 | 6. | 80 | 10. | 135 | 14. | 190 | 23. | 245 | 60. |
| 26 | 5. | 81 | 11. | 136 | 13. | 191 | 24. | 246 | 60. |
| 27 | 5. | 82 | 11. | 137 | 12. | 192 | 25. | 247 | 60. |
| 28 | 5. | 83 | 11. | 138 | 12. | 193 | 26. | 248 | 60. |
| 29 | 5. | 84 | 11. | 139 | 12. | 194 | 27. | 249 | 60. |
| 30 | 5. | 85 | 11. | 140 | 12. | 195 | 28. | 250 | 60. |
| 31 | 4. | 86 | 12. | 141 | 12. | 196 | 29. | 251 | 60. |
| 32 | 4. | 87 | 12. | 142 | 12. | 197 | 30. | 252 | 60. |
| 33 | 4. | 88 | 12. | 143 | 12. | 198 | 31. | 253 | 60. |
| 34 | 4. | 89 | 12. | 144 | 13. | 199 | 32. | 254 | 60. |
| 35 | 4. | 90 | 12. | 145 | 13. | 200 | 33. | 255 | 60. |
| 36 | 3. | 91 | 12. | 146 | 14. | 201 | 34. | 256 | 60. |
| 37 | 3. | 92 | 13. | 147 | 14. | 202 | 35. | 257 | 60. |
| 38 | 3. | 93 | 13. | 148 | 14. | 203 | 36. | | |
| 39 | 3. | 94 | 13. | 149 | 14. | 204 | 37. | | |
| 40 | 2. | 95 | 13. | 150 | 14. | 205 | 38. | | |
| 41 | 2. | 96 | 13. | 151 | 14. | 206 | 39. | | |
| 42 | 1. | 97 | 13. | 152 | 14. | 207 | 40. | | |
| 43 | 1. | 98 | 14. | 153 | 14. | 208 | 41. | | |
| 44 | 1. | 99 | 14. | 154 | 14. | 209 | 42. | | |
| 45 | 1. | 100 | 14. | 155 | 14. | 210 | 43. | | |
| 46 | 0. | 101 | 14. | 156 | 15. | 211 | 44. | | |
| 47 | 0. | 102 | 15. | 157 | 15. | 212 | 45. | | |
| 48 | 0. | 103 | 15. | 158 | 15. | 213 | 46. | | |
| 49 | 0. | 104 | 15. | 159 | 15. | 214 | 47. | | |
| 50 | 0. | 105 | 15. | 160 | 15. | 215 | 48. | | |
| 51 | 0. | 106 | 15. | 161 | 15. | 216 | 49. | | |
| 52 | 2. | 107 | 16. | 162 | 15. | 217 | 50. | | |
| 53 | 2. | 108 | 16. | 163 | 15. | 218 | 50. | | |
| 54 | 2. | 109 | 16. | 164 | 15. | 219 | 50. | | |
| 55 | 3. | 110 | 16. | 165 | 15. | 220 | 50. | | |

TABLE 2 table of critical bands and fmin
(used at 48 kHz sampling frequency)
The upper band edge is set to 20 kHz (line 214 at block length 256, line 428 at block length 512)
The following table is used at block length 512. The table for block length 256 can easily be calculated from the table for 512 block length. The tables for other sampling rates can also be calculated from this list.

| cb | start | width | fmin |
|---|---|---|---|
| 1 | 0 | 4 | .007 |
| 2 | 4 | 4 | .007 |
| 3 | 8 | 4 | .007 |
| 4 | 12 | 4 | .007 |
| 5 | 16 | 4 | .007 |
| 6 | 20 | 4 | .007 |
| 7 | 24 | 4 | .007 |
| 8 | 28 | 4 | .01 |
| 9 | 32 | 4 | .01 |
| 10 | 36 | 4 | .01 |
| 11 | 40 | 6 | .01 |
| 12 | 46 | 6 | .0144 |
| 13 | 52 | 8 | .0225 |
| 14 | 60 | 8 | .04 |
| 15 | 68 | 12 | .0625 |
| 16 | 80 | 12 | .09 |
| 17 | 92 | 16 | .09 |
| 18 | 108 | 20 | .09 |
| 19 | 128 | 26 | .1225 |
| 20 | 154 | 30 | .1225 |
| 21 | 184 | 38 | .16 |
| 22 | 222 | 50 | .2025 |
| 23 | 272 | 70 | .25 |
| 24 | 342 | 86 | |

| | | | | | | | | | | | | | | | |
|---|---|---|---|---|---|---|---|---|---|---|---|---|---|---|---|
| 17 | 17 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 17 | 17 | 17 | 17 | 17 | 14 |
| 17 | 17 | 17 | 17 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 17 | 17 | 17 | 17 | 17 | 14 |
| 18 | 17 | 17 | 17 | 17 | 16 | 16 | 16 | 16 | 16 | 16 | 16 | 16 | 16 | 16 | 16 |
| 16 | 16 | 16 | 16 | 16 | 16 | 16 | 16 | 17 | 17 | 17 | 17 | 17 | 17 | 17 | 14 |
| 18 | 17 | 17 | 17 | 17 | 17 | 17 | 16 | 17 | 16 | 16 | 16 | 16 | 16 | 16 | 16 |
| 16 | 16 | 16 | 16 | 16 | 16 | 16 | 16 | 16 | 17 | 17 | 17 | 17 | 17 | 17 | 13 |
| 18 | 18 | 17 | 17 | 17 | 17 | 17 | 17 | 17 | 17 | 16 | 17 | 16 | 17 | 17 | 16 |
| 17 | 17 | 17 | 16 | 16 | 16 | 17 | 17 | 17 | 17 | 17 | 17 | 17 | 17 | 17 | 14 |
| 18 | 18 | 17 | 17 | 17 | 17 | 17 | 17 | 17 | 17 | 17 | 17 | 17 | 17 | 17 | 17 |
| 17 | 17 | 17 | 17 | 17 | 17 | 17 | 17 | 17 | 17 | 17 | 17 | 17 | 17 | 18 | 14 |
| 18 | 18 | 17 | 17 | 17 | 17 | 17 | 17 | 17 | 17 | 17 | 17 | 17 | 17 | 17 | 17 |
| 17 | 17 | 17 | 17 | 17 | 17 | 17 | 17 | 17 | 17 | 17 | 17 | 17 | 17 | 17 | 14 |
| 18 | 18 | 18 | 18 | 18 | 17 | 18 | 17 | 17 | 17 | 17 | 17 | 17 | 17 | 17 | 17 |
| 17 | 17 | 17 | 17 | 17 | 17 | 17 | 17 | 17 | 17 | 17 | 17 | 17 | 17 | 17 | 14 |
| 19 | 18 | 18 | 18 | 18 | 18 | 18 | 17 | 17 | 18 | 17 | 18 | 17 | 17 | 17 | 17 |
| 17 | 17 | 17 | 17 | 17 | 17 | 17 | 17 | 17 | 17 | 17 | 17 | 17 | 17 | 18 | 13 |
| 19 | 19 | 18 | 18 | 18 | 18 | 18 | 18 | 18 | 18 | 18 | 17 | 17 | 18 | 17 | 17 |
| 17 | 17 | 17 | 17 | 17 | 17 | 17 | 17 | 17 | 17 | 17 | 17 | 17 | 17 | 18 | 14 |
| 15 | 15 | 15 | 14 | 14 | 14 | 14 | 14 | 14 | 14 | 14 | 14 | 14 | 14 | 14 | 14 |

-continued

| 14 14 | 14 14 | 14 14 | 14 14 | 14 14 | 14 13 | 14 14 | 14 8 |

We claim:

1. A method of processing an ordered time sequence of audio signals partitioned into contiguous blocks of samples, each such block having a discrete short-time spectrum, $S(\omega_i)$, i=1, 2, ... N, for each of said blocks, comprising predicting, for each block, an estimate of the values for each $S(\omega_i)$ based on the values for $S(\omega_i)$ for one or more prior blocks, determining for each frequency, $\omega_i$, a randomness metric based on the predicted value for each $S(\omega_i)$ and the actual value for $S(\omega_i)$ for each block, based on said randomness metrics, and the distribution of power with frequency in the block, determining the value of a tonality function as a function of frequency, and based on said tonality function, estimating the noise masking threshold at each $\omega_i$.

2. The method of claim 1 further comprising quantizing said $S(\omega_i)$ based on said noise masking threshold at each respective $\omega_i$.

3. The method of claim 1 wherein said step of predicting comprises, for each $\omega_i$, forming the difference between the value of $S(\omega_i)$ for the corresponding $\omega_i$ from the two preceding blocks, and adding said difference to the value for $S(\omega_i)$ from the immediately preceding block.

4. The method of claim 3, wherein said $S(\omega_i)$ is represented in terms of its magnitude and phase, and wherein said difference and adding are effected separately for the magnitude and phase of $S(\omega_i)$.

5. The method of claim 1, wherein said determining of said randomness metric is accomplished by calculating the euclidian distance between said estimate of $S(\omega_i)$ and said actual value for $S(\omega_i)$.

6. The method of claim 5, wherein said determining of said randomness metric further comprises normalizing said euclidian distance with respect to the sum of the magnitude of said actual magnitude for $S(\omega_i)$ and the absolute value of said estimate of $S(\omega_i)$.

7. The method of claim 1, wherein said estimating of the noise masking threshold at each $\omega_i$ comprises calculating an unspread threshold function, and modifying said unspread threshold function in accordance with a spreading function to generate a spread threshold function.

8. The method of claim 7, wherein said estimating of the noise masking threshold function further comprises modifying said spread threshold function in response to an absolute noise masking threshold for each $\omega_i$ to form a limited spread threshold function.

9. The method of claim 8, further comprising modifying said limited threshold function to eliminate any existing pre-echoes, thereby generating an output threshold function value for each $\omega_i$.

10. The method of any of claims 1, 7, 8 or 9, further comprising the steps of generating an estimate of the number of bits necessary to encode $S(\omega_i)$ quantizing said $S(\omega_i)$ to form quantized representations of said $S(\omega_i)$ using said estimate of the number of bits, and providing to a medium a coded representation of said quantized values and information about how said quantized values were derived.

11. A method for processing an ordered sequence of coded signals comprising first code signals representing values of the frequency components of a block of values of an audio signal and second code signals representing information about how said first signals were derived to reproduce said audio signal with reduced perceptual error, said method comprising using said second signals to determine quantizing levels for said audio signal which reflect a reduced level of perceptual distortion, reconstructing quantized values for said frequency content of said audio signal in accordance with said quantizing levels, and transforming said reconstructed quantized spectrum to recover an estimate of the audio signal.

12. The method of claim 11 wherein said reconstructing comprises using said second signals to effect scaling of said quantized values.

13. The method of claim 11 wherein said reconstructing comprises applying a global gain factor based on said second signals.

14. The method of claim 11 wherein said reconstructing comprises determining quantizer step size as a function of frequency component.

15. The method of claim 11 wherein said second signals include information about the degree of coarseness of quantization as a function of frequency component.

16. The method of claim 11 wherein said second signals include information about the number of values of said audio signal that occur in each block.

* * * * *

UNITED STATES PATENT AND TRADEMARK OFFICE
CERTIFICATE OF CORRECTION

PATENT NO. : 5,040,217

DATED : Aug. 13, 1991

INVENTOR(S) : Karlheinz Brandenburg and James D. Johnston

It is certified that error appears in the above-identified patent and that said Letters Patent is hereby corrected as shown below:

```
Column 2, line 68, "Eculidian" should read --Euclidian--.
Column 3, line 12, "described" should read --is described--.
Column 3, line 30, "invention; and" should read --invention;--.
Column 3, line 33, "invention." should read --invention; and--.
Column 4, line 2,  "typicall" should read --typically--.
Column 8, line 24, "using." should read --using--.
Column 9, line 10, "bistream" should read --bitstream--.
Column 9, line 11, "bistream" should read --bitstream--.
Column 9, line 12, "divide" should read --divided--.
Column 10, line 22, "1 sb+sign" should read --1sb+sign
Column 10, line 61, "1 sb's" should read --1sb's--.
Column 15, line 9, "1, 2, ... N" should read --1, 2, ..., N--.
Column 9, line 6, "bloth 105" should read --block 105--.
Column 11, line 30, "crital" should read --critical--.
Column 15, line 9, "1, 2, ... N" should read --1, 2, ..., N--.
```

Signed and Sealed this

Nineteenth Day of November, 1991

Attest:

HARRY F. MANBECK, JR.

Attesting Officer

Commissioner of Patents and Trademarks